US008137597B1

(12) United States Patent
Brott et al.

(10) Patent No.: US 8,137,597 B1
(45) Date of Patent: Mar. 20, 2012

(54) ONE-PART, PRESSURE ACTIVATED CHEMILUMINESCENT MATERIAL

(75) Inventors: Lawrence L. Brott, West Chester, OH (US); Brian E. O'Toole, Broadview Heights, OH (US); Christopher A. Vaiana, Whitestone, NY (US); Rajesh R. Naik, Dayton, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 140 days.

(21) Appl. No.: 12/787,418

(22) Filed: May 26, 2010

(51) Int. Cl.
*C09K 3/00* (2006.01)

(52) U.S. Cl. .......................................... 252/700; 362/34

(58) Field of Classification Search .................. 252/700; 362/34

See application file for complete search history.

(56) References Cited

U.S. PATENT DOCUMENTS

| | | | | | |
|---|---|---|---|---|---|
| 3,973,466 | A * | 8/1976 | Marcus et al. | ................. | 89/1.11 |
| 4,089,797 | A * | 5/1978 | Heller et al. | .................. | 252/700 |
| 7,610,857 | B1 * | 11/2009 | Dunnam et al. | .............. | 102/458 |
| 2007/0079722 | A1 * | 4/2007 | Parish | ........................... | 102/513 |

* cited by examiner

*Primary Examiner* — David W Wu
*Assistant Examiner* — Vu A Nguyen
(74) *Attorney, Agent, or Firm* — AFMCLO/JAZ; Bart Hersko

(57) ABSTRACT

A one-part, pressure activated chemiluminescent material is disclosed. The free-flowing powder is made by coating microcapsules, filled with a solvent and dye, with a powdered oxalate and a solid source for hydrogen peroxide. The reaction begins when the capsules are crushed, releasing the solvent, which dissolves the oxalate and the source for hydrogen peroxide. The resulting reaction transfers energy to the dye, which produces light.

16 Claims, 1 Drawing Sheet

ONE-PART, PRESSURE ACTIVATED CHEMILUMINESCENT MATERIAL

RIGHTS OF THE GOVERNMENT

The invention described herein may be manufactured and used by or for the Government of the United States for all governmental purposes without the payment of any royalty.

BACKGROUND OF THE INVENTION

Chemiluminescence is defined as the reaction of two or more chemicals to create light. One class of chemiluminescence uses a mixture of hydrogen peroxide with an oxalate and a dye dissolved in a suitable solvent to generate light. Hydrogen peroxide reacts with the oxalate to produce an unstable strained ring, which releases energy that excites the dye. As the dye returns to its ground state, a photon of light is released. Hydrogen peroxide and oxalate are consumed in this reaction, whereas the dye is not. Commercially available glowsticks use this reaction and can produce light for over 6 hours in a wide variety of colors. The structure of the dye determines the wavelength of light emitted. Examples of dyes include 9,10-diphenylanthracene which creates blue light, or rhodamine B which emits red light. Recent advancements in glowstick chemistry involve extending the lifetime of the chemical reaction, increasing its brightness, or creating new colors. Literature describing modifications of chemistry include U.S. Pat. Nos. 3,691,085 (1972), 4,678,308 (1987) and 6,126,871 (2000), all of which are incorporated herein by reference.

An early report of a packaged chemiluminescent device is mentioned in U.S. Pat. No. 3,819,925 (1974) in which the reactive chemicals are kept separate by storing a solution of hydrogen peroxide in a glass vial, which itself is stored inside a plastic tube also filled with a solution of oxalate and dye. The chemiluminescent reaction is initiated when the glass vial is broken, combining the hydrogen peroxide with the other chemicals. Slight adaptations of this packaging scheme are described in U.S. Pat. Nos. 4,064,428 (1977) and 4,379,320 (1983). Another variation is presented in U.S. Pat. No. 5,121,302 (1992), in which the two liquid parts are stored in a plastic bag, separated by a barrier. Removing the barrier causes the chemicals to mix, resulting in the chemiluminescent reaction. These systems lack the ability to control the extent of the chemical reaction. That is, once the reaction is initiated, it cannot be reversed or altered, leading to consumption of all contents of the glowstick. Control of the luminescent parameters is predetermined by the packaging volume of the chemicals. This is a disadvantage that limits applications requiring a user-defined reaction volume.

U.S. Pat. No. 3,973,466 (1976) describes a modification of both the chemistry and packaging of the chemiluminescent material. In this patent, the reactant tetrakisdimethylaminoethylene (TMAE) is microencapsulated. Microencapsulation is a technique in which micron-sized droplets of liquid are surrounded by an impermeable solid shell wall. When TMAE is exposed to the atmosphere, it oxidizes and produces green light. In this case, the shell wall isolates the core reactant from the air, until the capsules are crushed. An advantage of this one-part chemiluminescent system is the ability to widely disperse the capsules over a large area for perimeter control. However, there are few choices for color and the reaction lifetime is limited to fifteen minutes. Interestingly, the patent briefly describes applying this concept further to the oxalate/hydrogen peroxide chemistry typically used with the glowsticks. In this illustration, microcapsules containing the dye, oxalate and solvent are mixed with another batch of microcapsules containing liquid hydrogen peroxide. This blend of capsules is crushed together, releasing the dissimilar cores and starting the chemiluminescent reaction. This arrangement has disadvantages since the two types of microcapsules need to be in intimate contact with each other for the reaction to proceed, an unlikely event when dispersed over a large area.

It is desirable to develop a true one-part microencapsulated chemiluminescent system based on the oxalate/hydrogen peroxide chemistry. This system would take advantage of the wide range of dyes available, as well as the long luminescent lifetimes of these systems. Additionally, this system would allow the user to portion the desired amount of reactants, reducing waste. Finally, this approach would allow the freedom to widely disperse the capsules.

SUMMARY OF THE INVENTION

The current invention transforms the liquid chemicals of the traditional glowstick devices into a free flowing, dry powder. The process begins by microencapsulating the dye and solvent using known techniques. The capsules are then added to an oxalate solution in toluene, and the solvent is allowed to evaporate almost to completion. While the capsules are still damp, a finely milled source of solid hydrogen peroxide is added to the capsule slurry, further coating the capsules. The toluene is then evaporated to completion. The powder is composed of microcapsules which include all the required starting materials for a chemiluminescent reaction: the solvent and dye comprise the core of the capsule, while the oxalate and a source of hydrogen peroxide coat the shell. When the capsule is broken, the solvent dissolves the oxalate and source for hydrogen peroxide, beginning the chemiluminescent reaction.

This invention relieves the need of packaging a two-part system, allowing more versatile applications. The powder can be divided to amounts dictated by the user's needs, thereby reducing waste. The transformation of the starting chemicals to solid forms also improves the shelf life of the system. By taking advantage of the wide variety of dyes available to produce different colors, it is now possible to produce unique colors through the combination of capsules filled with different dyes. It is also conceivable to make nanocapsules and incorporate them into a gel pen, yielding a chemiluminescent writing utensil. It is also conceivable to incorporate these microcapsules into paper, creating a pressure sensitive, chemiluminescent writing method. Additionally, it is also conceivable to make macrocapsules for use in perimeter control.

DETAILED DESCRIPTION OF THE INVENTION

Figure 1:
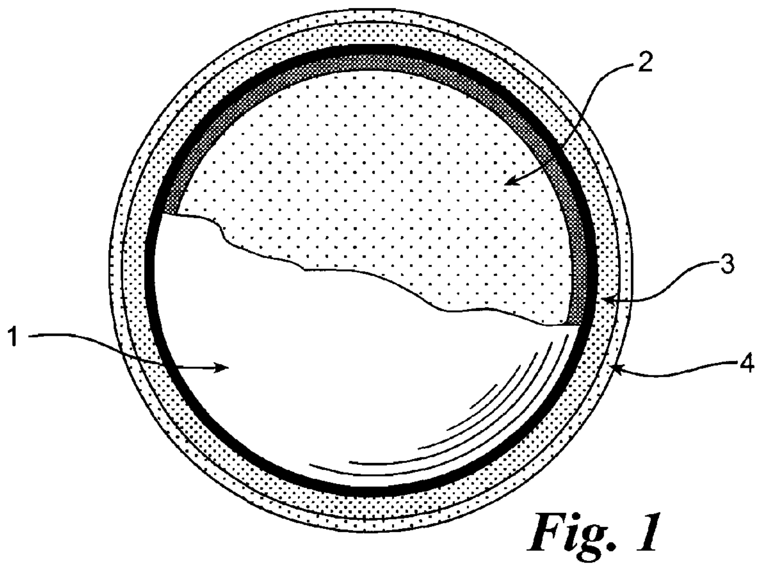
FIG. 1 is an enlarged, cross-sectional view of one of the microcapsules.

Chemical Compositions:

The chemistry used for glowsticks is a mature technology and there is no attempt to optimize it. Those familiar with the art will realize that only the required materials are used in this patent and that additional materials can be further added to the capsule core or coated to its shell. The minimum starting materials include a solvent, oxalate, dye and a source of hydrogen peroxide.

Solvent systems for chemiluminescent reactions are well established, and are typically mixtures of dialkyl phthalates (such as dimethyl phthalate, dibutyl phthalate or dioctyl phthalate) and alkyl alcohols (such as t-butyl alcohol). A requirement is that the solvent at least partially dissolves the dye, oxalate and source of hydrogen peroxide. Additionally, it should be remembered that certain microencapsulation techniques require that the solvents are hydrophobic. Dioctyl phthalate is a preferred solvent.

The oxalates that can be used in this reaction include bis (2,4,5-trichloro-6-carbopentoxyphenyl)oxalate or bis(2-carbopentyloxy-3,5,6-trichlorophenyl)oxalate, the later being the preferred oxalate.

There are many dyes that can be used, each yielding a different color of light. For example, 9,10-diphenylanthracene will yield a blue color, while 9,10-bis(phenylethynyl)anthracene will yield a green color. Likewise, rhodamine 6G produces an orange light, and rhodamine B will create a red light. Finally, violanthrone-79 will yield an infrared light.

Useful catalysts, while not used nor required in this invention, include sodium salicylate.

A requirement of this invention is the use of a solid source of hydrogen peroxide. The solid form is thermally stable and safe to handle. Examples of this form of hydrogen peroxide include sodium perborate, sodium percarbonate, or urea peroxide. Sodium percarbonate is a preferred form. When dissolved, sodium percarbonate releases hydrogen peroxide and sodium carbonate. A further advantage of using sodium percarbonate is that it releases a weak base, which itself acts as a catalyst. The solid can be milled to a fine powder to achieve a high surface area.

Microencapsulation:

Generally, there are two classes of microencapsulation techniques: mechanical and chemical. Either class is suitable for this patent, though chemical encapsulation has been extensively studied in this work. It is not the focus of this patent to optimize the microencapsulation procedure. Examples of both types of microencapsulation techniques can be found in U.S. Pat. Nos. 2,800,457 (1957), 3,015,128 (1962) and 3,429,827 (1969), all of which are incorporated herein by reference.

There are many mature chemical microencapsulation techniques that can be used, such as complex coacervation, in-situ, or interfacial microencapsulation. Chemical microencapsulation takes advantage of the water and oil immiscibility. As such, the core (the oil phase) is vigorously blended in a water phase to create micron-sized droplets. Once the droplets are created, a hard polymer shell is permanently created around the oil drop. When the process is complete, the microcapsules are separated from the water phase and dried. Advantages of these chemical methods of encapsulation include low initial cost of equipment and low cost of starting materials.

Complex coacervation is perhaps the most industrially significant technique, and is the preferred technique for this invention. Complex coacervation relies on the interaction of two polymers, typically gelatin and gum arabic, to form a shell around an oil droplet through a change in pH. Typical capsules contain between 80-90% core material and have excellent barrier properties when stored dry. One disadvantage of using this technique is that the starting polymers are natural products and as a result, capsules can vary batch by batch.

In-situ microencapsulation relies on dissolving organic monomers in the water phase of the reaction. Typical starting materials include urea, resorcinol and formaldehyde. To begin the process, urea and resorcinol are dissolved in the water phase and blended with the oil core to form micron-sized drops. Once a steady state has been reached, formaldehyde is added to begin the polymerization process. The reaction is complete after four hours, leaving hard, spherical capsules. Since high purity monomers are used in this technique, batch-to-batch reproducibility is good.

Interfacial microencapsulation is a slight variation on in-situ, in that some of the monomers are dissolved in the water phase while the rest are dissolved in the oil core. When the two types of monomers combine at the oil/water interface, a polymer is formed, creating a hard shell. Any voids in the shell are quickly sealed by newly formed polymer, resulting in microcapsules that are relatively impermeable. Additionally, since the capsules are made with high purity monomers, the capsules are consistent between batches. One drawback, however, is that since some of the monomers are dissolved in the core, there is a chance that the monomer could also react with the dye that is used in the chemiluminescent reaction.

Desired sizes of capsules depends on the application. Nanocapsules in a range of 500-1000 nm are suitable for use in gel pen applications, whereas microcapsules in a range of 1-100 □m are useful in carbonless paper applications. Macrocapsules in the range of 1000-5000 □m are useful for perimeter control. It is therefore apparent that the optimum size depends heavily on its intended use.

Complete Formulation:

The creation of the product described in this invention is a two-step process: (1) the formation of the microcapsule, and (2) the coating of the capsules.

While the formation of microcapsules using complex coacervation is extensively used and the preferred technique, this patent is not limited to this technique alone. Complex coacervation begins by mechanically stirring a solution of gelatin dissolved in water at 50° C. and adjusting its pH to an alkaline range. The core, a solution comprising of a dialkyl-phthalate solvent and dye, is then added, and the mixture is stirred vigorously to create small droplets of the oily core. The mixture is then further diluted with additional water and a small amount of a defoamer is added. A polyanion solution, such as sodium hexa-metaphosphate dissolved in water, is added and the reaction is allowed to return to a steady state. The pH is then slowly lowered through the addition of acetic acid. After additional mixing, the solution is gradually cooled over two hours to room temperature, at which time a crosslinking solution is added.

After an additional two hours of stirring, the resulting microcapsules are filtered and a small amount of fumed silica is added to aid in drying and to prevent clumping. The capsules are then sieved to remove impurities.

The capsules are then coated by submerging them in an oxalate solution. The mixture is stirred to allow the solvent to evaporate until almost dry. Finely powdered hydrogen peroxide precursor is then added to the slurry and gently mixed until the capsules are dry. The completed product is sieved again to remove small impurities.

FIG. 1 illustrates a completed microcapsule. The capsule wall “1” is composed of cross-linked gelatin and hexa-metaphosphate, while the core “2” consists of the dye dissolved in a hydrophobic solvent. The microcapsules are coated twice, first with a crystalline oxalate “3”, followed by a solid source for hydrogen peroxide “4”.

Example 1

Microencapsulation by "Complex Coacervation"

Prepare five solutions one hour before the encapsulation process:

Solution A: Dissolve 2.73 g gelatin (type A from porcine skin, 300 bloom) in 30 mL distilled water.

Solution B: Dissolve 50 mg of violanthrone-79 in 20 mL of dioctyl phthalate at 50° C., under nitrogen.

Solution C, 27.5 mL distilled water, warmed to 50° C.

Solution D: Dissolve 263 mg sodium hexa-metaphosphate in 5 mL distilled water.

Solution E: Dilute 5 mL glutaraldehyde (25% in water) with 10 mL of distilled water.

Procedure: Stir the entire amount of gelatin solution "A" in a 150 mL beaker with a 2-inch, 4-blade mechanical stirrer at 250 rpm. Heat to 50° C. while stirring. Increase the pH of the solution to 8.0 by adding aqueous 10% NaOH solution. Slowly add core solution "B". Allow to mix for 10 minutes. Ensure the solution returns to 50° C. Add dilution water "C" and 2 drops of 1-octanol to defoam. Add the polyanion solution "D", and ensure the solution returns to 50° C. Slowly add 50% acetic acid dropwise (one drop every 20-30 seconds) until the pH reaches 4.5. Cover the beaker with a double layer of aluminum foil. Allow the solution to mix at 50° C. for 15 minutes, then remove the heat. Continue to mix for 2 hours. Add the crosslinking solution "E" and continue to mix for an additional 2 hours.

Turn off the mixer. Vacuum filter the capsules with a Wattman #4 filter in a Buchner funnel and rinse twice with distilled water. Spread the capsules over several layers of paper towel and gently mix 7 nm fumed silica with the capsules and let air dry. Separate the capsule sizes by sifting through sieves.

Coating the Microcapsules

Prepare three materials in advance:

Material F: 1 g of above prepared microcapsules, size fraction: 0.5-1.0 mm.

Solution G: Dissolve 500 mg bis(2-carbopentyloxy-3,5,6-trichlorophenyl)oxalate in 1 mL of toluene.

Material H: 500 mg Sodium percarbonate (finely ground, screened <90 □m).

Procedure: Place the microcapsules "F" in an aluminum weigh dish, and coat with the oxalate solution "G" so that the liquid covers all of the capsules. Gently stir the capsules every 2 minutes for 10 minutes. Add sodium percarbonate "H" and gently stir the capsules. Allow the capsules to dry for an additional 10 minutes, and then sift the excess sodium percarbonate from the coated capsules over a 250□m mesh screen. Store the capsules in a cool, dry environment.

Optical Properties

Figure 2:
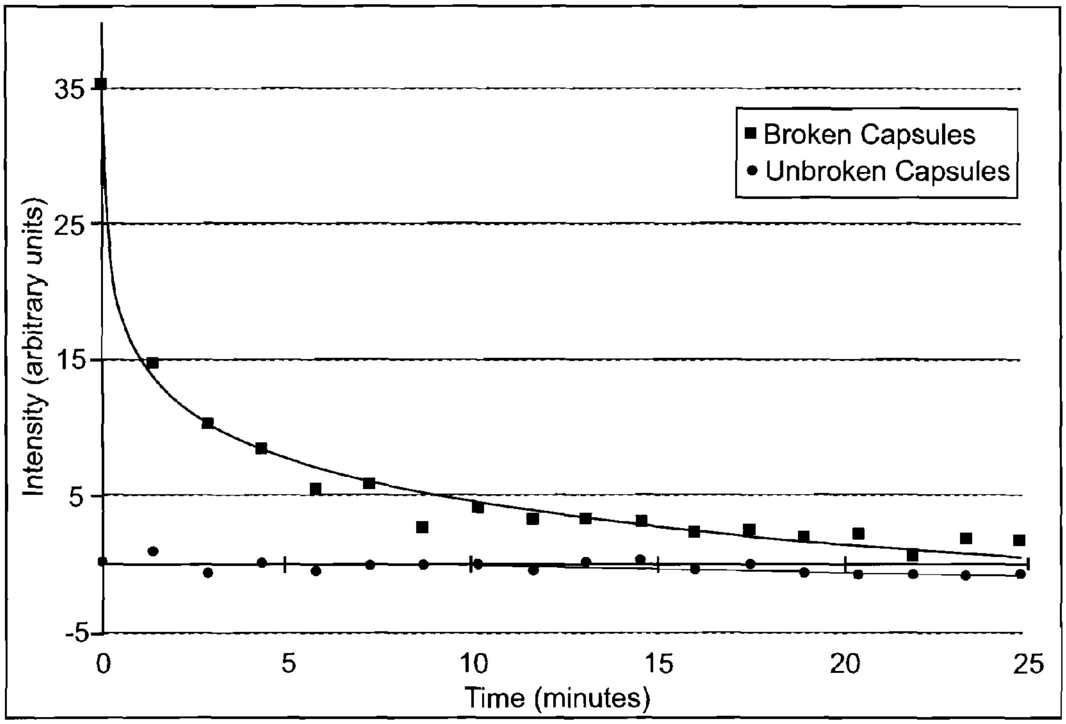
FIG. 2 is graph comparing the intensity of the chemiluminescent reaction over time of broken capsules to that of unbroken capsules.

The resulting capsules were examined in a Varian Cary Eclipse fluorescence spectrophotometer to study the lifetimes and brightness of the reaction. In this experiment, 0.2 g of the coated microcapsules were placed in the sample cell and emissions at 730 nm were recorded before and after crushing the capsules. FIG. 2 demonstrates that the capsule wall serves as an exemplary barrier between the solvent and oxalate, and that the reaction is only activated when the capsules are crushed. Additionally, it is clear that once the solvent is released, it dissolves both the oxalate and sodium percarbonate, beginning the chemiluminescent reaction.

Example 2

Microencapsulation by "In-Situ"

Prepare two solutions in advance:

Solution I: Dissolve 1.0 g poly(ethylene-alt-maleic anhydride) in 40 mL of distilled water for 16 hours at 50° C.

Solution J: Dissolve 50 mg of violanthrone-79 in 20 mL of dioctyl phthalate at 50° C., under nitrogen.

Procedure: In a 150 mL beaker, dissolve 1.250 g of urea, 0.125 g of ammonium chloride and 0.125 g of resorcinol in 50 g of distilled water by mechanically stirring with a 2-inch, 4-blade stirrer at 250 rpm. Once dissolved, add 12.5 mL of solution "I" and then adjust the pH of the mixture to 3.5 using 10% NaOH solution. While stirring, add 15 mL of solution "J" to the beaker and allow the droplets to equilibrate for 10 minutes. Finally, add 3.168 g of 37% formaldehyde in water. Cover the beaker with a double layer of aluminum foil. At a rate of 1° C./minute, slowly heat the beaker to 55° C., and once at that temperature, continue to heat for an additional 4 hours. Allow to cool, and filter the capsules with a Wattman #4 filter in a Buchner funnel. Rinse twice with distilled water. Dry the capsules at room temperature and sort by size by sifting through sieves.

Coating the Microcapsules

Procedure: Coat the capsules as described in Example 1.

Example 3

Using the completed, coated microcapsules as described in Example 1, combine 0.14 g of the capsules with 0.5 mL of poly(ethylene glycol) ($M_n$=300) until homogenous. No infrared light is observed until the capsules are crushed.

What is claimed is:

1. A one-part microencapsulated chemiluminescent system comprising:

a.) a microcapsule, the microcapsule having an inner core and a liquid impermeable polymer shell surrounding the core;

b.) a dye and a hydrophobic solvent contained within the core of the microcapsule;

c.) a coating on the outside of the polymer shell, the coating comprising an oxalate and a source of hydrogen peroxide;

wherein the liquid impermeable polymer shell serves as a barrier between the dye and the hydrophobic solvent contained within the microcapsule and the oxalate and the source of hydrogen peroxide coating on the outside of the microcapsule polymer shell; and wherein when the shell of the microcapsule is broken, the hydrophobic solvent at least partially dissolves the oxalate and the source of hydrogen peroxide, thereby beginning a chemiluminescent reaction.

2. The one-part microencapsulated chemiluminescent system of claim 1 wherein said source of hydrogen peroxide is a solid powder.

3. The one-part microencapsulated chemiluminescent system of claim 2 wherein said source of hydrogen peroxide is selected from the group consisting of sodium perborate, sodium percarbonate, and urea peroxide.

4. The one-part microencapsulated chemiluminescent system of claim 3 wherein said source of hydrogen peroxide is sodium percarbonate.

5. The one-part microencapsulated chemiluminescent system of claim 1 wherein said oxylate is bis(2,4,5-trichloro-6-carbopentoxyphenyl)oxalate or bis(2-carbopentyloxy-3,5,6-trichlorophenyl)oxalate.

6. The one-part microencapsulated chemiluminescent system of claim 5 wherein said oxylate is bis(2-carbopentyloxy-3,5,6-trichlorophenyl)oxalate.

7. The one-part microencapsulated chemiluminescent system of claim 1 wherein said hydrophobic solvent is a dialkyl phthalate.

8. The one-part microencapsulated chemiluminescent system of claim 7 wherein said dialkyl phthalate hydrophobic solvent is dioctyl phthalate.

9. The one-part microencapsulated chemiluminescent system of claim 1 wherein said dye is selected from the group consisting of 9,10-diphenylanthracene, 9,10-bis(phenylethynyl)anthracene, rhodamine 6G, rhodamine B, and violanthrone-79.

10. The one-part microencapsulated chemiluminescent system of claim 1 wherein said dye yields a colored light dependent on the dye used when the microcapsule is broken.

11. The one-part microencapsulated chemiluminescent system of claim 10 wherein said dye is violanthrone-79 and wherein the violanthrone-79 dye yields an infrared-colored light when the microcapsule is broken.

12. The one-part microencapsulated chemiluminescent system of claim 1 wherein the coating comprises two layers, an inside layer and an outside layer, with the oxalate contained on the inside layer and the source of hydrogen peroxide contained on the outside layer.

13. The one-part microencapsulated chemiluminescent system of claim 1 wherein said microcapsule is made by a chemical technique.

14. The one-part microencapsulated chemiluminescent system of claim 13 wherein said microcapsule is made by complex coacervation, interfacial or in-situ microencapsulation.

15. The one-part microencapsulated chemiluminescent system of claim 14 wherein said microcapsule is made by complex coacervation.

16. The one-part microencapsulated chemiluminescent system of claim 1 wherein a catalyst to enhance the chemiluminescent reaction is added to either the core of the microcapsule or to the coating on the outside of the polymer shell.

* * * * *